United States Patent
McGuire, Jr. et al.

(10) Patent No.: US 8,828,303 B2
(45) Date of Patent: Sep. 9, 2014

(54) METHODS FOR POLYMERIZING FILMS IN-SITU USING A RADIATION SOURCE

(75) Inventors: James E. McGuire, Jr., Westerville, OH (US); Michael Lee Owens, Circleville, OH (US); Andrew C. Strange, Worthington, OH (US)

(73) Assignee: entrotech, inc., Columbus, OH (US)

(*) Notice: Subject to any disclaimer, the term of this patent is extended or adjusted under 35 U.S.C. 154(b) by 188 days.

(21) Appl. No.: 13/051,927

(22) Filed: Mar. 18, 2011

(65) Prior Publication Data

US 2011/0241261 A1 Oct. 6, 2011

Related U.S. Application Data

(60) Provisional application No. 61/319,818, filed on Mar. 31, 2010.

(51) Int. Cl.
*B29C 41/12* (2006.01)
*C08J 5/18* (2006.01)
*B29C 39/18* (2006.01)
*C08J 3/28* (2006.01)
*B29C 41/24* (2006.01)
*B29C 35/08* (2006.01)
*B29K 75/00* (2006.01)
*B29C 35/10* (2006.01)

(52) U.S. Cl.
CPC .... *C08J 3/28* (2013.01); *C08J 5/18* (2013.01); *B29C 39/18* (2013.01); *C08J 2375/16* (2013.01); *B29C 2035/0877* (2013.01); *B29K 2075/00* (2013.01); *B29C 35/10* (2013.01); *B29C 35/08* (2013.01); *B29C 2035/0827* (2013.01); *B29C 2035/0822* (2013.01); *B29C 41/24* (2013.01)
USPC ............................ 264/446; 264/447; 264/494

(58) Field of Classification Search
CPC ...... B29C 41/003; B29C 41/12; B29C 59/16; B29K 2075/00
USPC .......................................... 264/446, 447, 494
See application file for complete search history.

(56) References Cited

U.S. PATENT DOCUMENTS

| | | | | |
|---|---|---|---|---|
| 3,539,424 A | * | 11/1970 | Tashlick | 156/238 |
| 3,689,346 A | * | 9/1972 | Rowland | 156/245 |
| 4,034,708 A | | 7/1977 | Fielder et al. | |
| 4,131,602 A | | 12/1978 | Hodakowski et al. | |
| 4,181,752 A | | 1/1980 | Martens et al. | |
| 4,207,356 A | | 6/1980 | Waugh | |
| 4,292,827 A | | 10/1981 | Waugh | |
| 4,332,074 A | | 6/1982 | Auld et al. | |
| 5,148,574 A | | 9/1992 | Leclere et al. | |
| 5,183,597 A | | 2/1993 | Lu | |
| 5,260,095 A | | 11/1993 | Affinito | |
| 5,428,087 A | | 6/1995 | Petit et al. | |
| 5,691,846 A | * | 11/1997 | Benson et al. | 359/530 |
| 6,045,864 A | | 4/2000 | Lyons et al. | |
| 7,074,463 B2 | | 7/2006 | Jones et al. | |
| 7,138,466 B2 | | 11/2006 | Hung et al. | |
| 7,151,151 B2 | | 12/2006 | Richter et al. | |
| 7,157,527 B2 | | 1/2007 | Kuntimaddi et al. | |
| 7,157,572 B2 | | 1/2007 | Lee | |
| 7,160,973 B2 | | 1/2007 | Ohrbom et al. | |
| 8,013,099 B2 | | 9/2011 | Poppe et al. | |
| 2002/0132049 A1 | | 9/2002 | Leonard et al. | |
| 2003/0075264 A1 | * | 4/2003 | Terakado et al. | 156/244.24 |
| 2003/0138842 A1 | | 7/2003 | Seul et al. | |
| 2003/0148044 A1 | | 8/2003 | Auld et al. | |
| 2008/0026233 A1 | * | 1/2008 | Kunz et al. | 428/457 |
| 2009/0297724 A1 | | 12/2009 | Weber | |
| 2011/0137006 A1 | | 6/2011 | McGuire, Jr. et al. | |

FOREIGN PATENT DOCUMENTS

| | | |
|---|---|---|
| GB | 2021599 | 12/1979 |
| GB | 1590413 A | 6/1981 |
| GB | 2194951 | 3/1988 |
| GB | 2194951 A | 3/1988 |
| WO | WO-2007/033786 | 3/2007 |
| WO | WO2010/036981 | 4/2010 |

OTHER PUBLICATIONS

"Argotec 49510 Technical Data Sheet," Argotec, Inc. (Greenfield, MA) —http://www.argotec.com/techsheets/Argotec%2049510.pdf (Oct. 2003).

Hackett, Earl T., "Film Inspection Using Cross-Polarized Light: The Old Method Can Give New Life to Film Inspection Procedures," *Pharmaceutical & Medical Packaging News*—http://www.devicelink.com/pmpn/archive/04/07/004.html (Jul. 2004).

* cited by examiner

*Primary Examiner* — James Sanders
(74) *Attorney, Agent, or Firm* — The Griffith Law Firm, AP.C.; Lisa M. Griffith

(57) ABSTRACT

A method for formation of a polymer film in-situ according to the invention comprises steps of: providing a polymerizable composition in one or multiple parts; prior to completion of polymerization of the polymerizable composition, forming a film therefrom; and initiating polymerization of the polymerizable composition using a radiation source to form the polymer film.

30 Claims, No Drawings

METHODS FOR POLYMERIZING FILMS IN-SITU USING A RADIATION SOURCE

BACKGROUND OF THE INVENTION

The present invention is directed toward methods for polymerizing compositions in-situ using a radiation source such that polymer films are formed therefrom.

Polymeric materials (also referred to herein simply as "polymers") are used in many applications. Polymeric materials can be formed into a wide variety of shapes suitable for their intended application. Some applications impose more stringent requirements on dimensions or other properties of materials used than others. For example, optical clarity of polymeric materials is an important consideration when selecting polymeric materials for use in optical applications. As a further example, many applications require that polymeric materials used therein consist of single layer films having controlled dimensions.

A "film" is generally understood to be a relatively thin, continuous, single layer of material. In contrast, many conventionally applied "coatings" do not form a continuous or uniform layer of material on an underlying substrate. As such, coatings (e.g., vapor coatings and ink jet-printed coatings) are often not able to be physically separated from the supporting substrate on which they are formed so that they can be used as a stand-alone layer or as one of multiple layers in another application. Thus, such coating technology has its limitations and is generally deficient for formation of polymeric films.

U.S. Pat. No. 4,207,356 describes one application of coating technology. Disclosed therein is a method of coating glass containers with a layer of plastic. Using the methods therein, uncured polyurethane liquid plastic is mixed and metered in predetermined amounts to each nozzle means and cast from separate nozzle means as the bottle is rotated at approximately 40-60 revolutions per minute beneath the nozzle means. According to the methods therein, liquid plastic is said to be flow-coated to a thickness of 100-250 microns per bottle, sometimes using multiple passes to obtain the desired coating thickness. After the coating is cast onto the bottle, the coated bottle is moved to a curing zone for a curing step. Curing can be accomplished using thermal radiation or by photocuring.

Similarly, U.S. Pat. No. 4,034,708 describes a casting operation for making plastic emblems. As described therein, an operator applies measured portions of a plastic material, such as liquid polyurethane, to the upper surface of a substrate. Preferred are polyurethane resins to which a catalyst is added just prior to casting in order to initiate a curing reaction. Further, an infrared radiation source may be provided to irradiate the polyurethane in order to rapidly drive off volatile liquids present in the liquid polyurethane and promote curing of the composition. Also discussed therein is the possibility of irradiating the substrates prior to casting, thereby reducing the viscosity of the cast plastic as it flows onto the substrate. This is said to allow for more even flow over larger substrates. Whatever method is used, however, an objective discussed throughout this patent is the prevention of plastic material from flowing over the edge of the emblem on which it is applied; thus, it is stated that it is important to hold the substrate flat during the entire casting and curing process.

See also U.S. Patent Publication No. 2003/0148044, which discusses plastic emblems having an enhanced depth of vision. In addition to a layer of plastic material therein, such emblems contain a transparent plastic overlay flow-coated over the image or design therein. It is stated that one preferred plastic material is polyurethane comprising the reaction product of: (A) a polyester glycol and low to medium molecular weight polypropylene triols, and (B) aliphatic diisocyanate-polypropylenetriol adduct. After mixing (A) and (B), the mixture is cast onto a decorative substrate to form a radiused edge based on the flow pattern, after which time it is cured by heat or irradiation such as ultraviolet irradiation. Gel times of such polyurethanes are selected to be approximately 4 minutes to 7 minutes. It is stated that preferably a catalyst is added to component (A) in order to promote a slow cure at room temperature so as to allow full flow of the liquid polyurethane to the edges of the substrate before setting.

Also see U.S. Pat. No. 6,045,864, which describes a coating system and method that allows coatings, such as polyurethane coatings, to be formed from a variety of coatable compositions that are entirely free of or have relatively little solvent. A fluid composition described therein is atomized and contacted with a carrier gas to vaporize substantially all of the atomized fluid composition, which condenses onto a surface to form a coating. However, such coatings are said to be capable of formation to thicknesses ranging only from 0.01 micrometer to 5 micrometers in a single pass, requiring multiple depositions or passes for formation of thicker films or multilayer sheets.

Due to the limitations of coating technology, many coating layers so formed are used in combination with one or more other layers in various articles. For example, see U.S. Pat. No. 7,160,973, which describes preparation of urethane polymers. The polymers are said to be useful as coating compositions that can be applied on an article/substrate by techniques that include spray coating, dip coating, roll coating, curtain coating, and the like. The coating compositions are also stated to be useful as a high-gloss coating and/or as the clearcoat of a composite color-plus-clear coating.

As a further example, see U.S. Patent Publication No. 2009/0297724, which describes an ultraviolet-curable coating composition containing aliphatic urethane resins. Application of the compositions therein as a "top coating" having a thickness of about 3 to about 35 microns on a base plastic material having a thickness of about 0.75 to 20 mm is described. A cured such top coating is stated to provide a high degree of scratch, abrasion, mar and chemical resistance along with superior UV resistance, exterior durability and thermal stability. The coating is described as being applied by various conventional coating methods, such as spray coat, rotary atomization, flowcoat, curtain coat, or roll coat techniques to a film thickness of about 3 microns to about 40 microns, with the most preferred dry film thickness being about 5 microns to about 20 microns. Coatings therein are described as being useful for exterior protection on automobiles.

In contrast to coatings, a film may be used apart from an underlying substrate on which it is typically formed. Further, films are capable of imparting desired properties to their intended application without the need for coating multiple layers or laminating multiple films together.

Polymeric films are widely used in many applications. Whether a polymeric film is suitable for an intended application depends upon, for example, its physical properties such as strength, elasticity, clarity, color, durability, and the like. To be desirable for use in an application, however, preparation and application of the polymeric film must be cost-effective.

In addition to minimization of cost, optimization of a film for an intended application poses other challenges. In regards to optical applications, the amount of gelation occurring during formation of the film has been found to impact its optical qualities. A "gel" is generally understood to be a viscous composition, which in polymer processing can be, for example, an at least partially polymerized composition, one having a relatively high molecular weight, and/or one containing significant amounts of entrapped gas (e.g., air or reaction by-products, such as carbon dioxide). Gelation can make formation of uniform layers of polymeric material (e.g., films) difficult. Hence, optical quality of a film formed in the presence of significant gelation is often compromised.

Although "non-yellowing" films advertised as having "low gel" content are known (e.g., ARGOTEC 49510, a polycaprolactone based, aliphatic polyurethane film available from Argotec, Inc. of Greenfield, Mass.), preparation of such films is difficult. For example, a contributing cause to deterioration in a film's optical quality is gelation associated with entrapment of gases. Entrapment of gas, such as carbon dioxide produced when conventionally processing polyurethane films, is often encountered when polymerizing materials. The entrapped gas creates imperfections in the material, which can appear as visible imperfections impairing the optical qualities of the material. In optical applications, imperfections having a size of about 10 microns or greater are generally objectionable. Imperfections having a size of as small as about 5 microns are even often viewed as problematic.

Gelation also complicates the common hot-melt processing of polymeric materials. For example, when processing a conventional hot-melt processable composition into a film format, polymerization of the composition causes gelation that can result in processing inefficiencies in that, e.g., dispensing nozzle or extrusion, equipment used therewith can become clogged due to the continuously increasing or non-uniformly increasing viscosity of the polymerizing composition during hot-melt processing thereof.

In addition to the disadvantages associated with gelation in conventional processing of polymeric materials, many conventional processing techniques lack the overall processing efficiency desired. For example, a further disadvantage of conventional hot-melt processing techniques relates to the fact that hot-melt processing generally involves multiple processing steps. For example, in many applications, some method of increasing the cohesive strength of applied hot-melt compositions is often required (e.g., post-crosslinking or moisture-curing). In addition, some polymer chemistries are not capable of being hot-melt processed due to their relatively high molecular weight and/or the presence of crosslinking, both of which can make it difficult, if not impossible, to hot-melt process preformed pellets of the compositions (as is done generally according to conventional methods of forming polymer films using hot-melt processing) at a temperature below the degradation temperature of the polymer composition or substrate onto which the film is formed. Thus, the properties of conventionally manufactured polymer films are limited to those particular polymer chemistries that can be formed into films using conventional methodology.

Alternative methods to hot-melt processing also have their disadvantages, including not only the need to often perform additional processing steps to increase the cohesive strength of the material after film formation, but other disadvantages as well. In addition to essentially 100% solid hot-melt systems, it is known to produce polymers in both solventborne (i.e., those using mostly organic solvents as a solvating medium) and waterborne (i.e., those using mostly water as a dispersing medium) systems. These systems are applied to a substrate in the form of a solution or dispersion, respectively. Whether the system is solventborne or waterborne, however, it must first be coated onto a desired substrate and then dried to remove solvating or dispersing medium (i.e., organic solvent or water, respectively) in order to form a polymer film. Thus, processing efficiency is compromised by these additional processing steps, much as processing efficiency is compromised by the need to otherwise cure a composition after coating it onto a substrate using hot-melt processing or otherwise. In addition, formation of polymer films of sufficient thickness can be problematic using these alternative methods. Further, organic solvent-based polymerization methods present environmental concerns and are typically costly to utilize. In addition, some polymer chemistries are not capable of being formed into polymer films using solventborne methods due to the lack of adequate solubility of such polymers or their constituents in conventional solvents.

Still further, while continuous methods of polymerization on a web are known (i.e., conventional methods of on-web polymerization of (meth)acrylate adhesives), those methods typically require additional processing steps as well. For example, processing steps associated with pre-polymerizing conventional compositions to increase their viscosity such that the compositions are coatable onto the web are generally required when using such methods. If such pre-polymerization is not performed, the generally low molecular weight monomers used in preparation of such adhesive films typically flow uncontrollably off the web onto which they are coated before being polymerized. When performing such pre-polymerization, however, process efficiency is compromised as such pre-polymerization generally requires the use of an expensive chemical reactor or obtainment of specialized components that are pre-polymerized. Thus, alternative processing methods are desirable to improve overall efficiency when processing polymeric materials.

It is known to use a variety of processes for formation of articles having polymer (e.g., polyurethane-based) layers and systems utilizing a variety of chemistries in order to improve overall performance properties of the polymer system. In addition to the variety of conventional processing techniques for formation of conventional polymer films and articles, a wide variety of polymer chemistries are known. Polymer chemistry is often selected according to the intended end-use application.

Polyurethane-based chemistries are well known and used in many different types of applications. For example, polyurethane-based chemistries are known for their ability to provide superior optical and other performance properties. Despite the widespread use of polyurethane-based chemistry, obtainment of both maximized optical performance and processing efficiency has often not been possible when using traditional methods for processing polyurethane-based films.

Thus, polyvinyl chloride is often used as a less expensive substitute for polyurethane-based chemistries, particularly in cost-sensitive applications (as the cost of polyvinyl chloride films is often about 10% to about 35% of the cost of a comparable polyurethane film). However, polyvinyl chloride is less desirable than polyurethane-based chemistries because of, for example, problems associated with plasticizer migration inherent when using polyvinyl chloride (that is of sufficient flexibility for many applications) and the controversial use of vinyl chloride monomers. Commonly used polyvinyl chloride plasticizers (e.g., phthalates) have been shown to negatively affect certain hormonal functions such as a body's endocrine system. Further, vinyl chloride monomers have been recognized as a carcinogen since the early 1970s. Still further, when polyvinyl chloride is burned, it often creates hazardous, halogen-based air pollutants such as hydrogen chloride. As such, many environmental and public safety organizations strongly oppose the manufacture of polyvinyl chloride, especially plasticized polyvinyl chloride, many governments are considering legislating or banning the use of polyvinyl chloride, and many companies are phasing out the use of polyvinyl chloride in their products.

Not surprisingly, alternatives to conventional polyvinyl chloride, such as increased use of polyurethane chemistry, are desirable and of interest. For example, U.S. Pat. No. 5,428,087 describes preparation of a modified polyvinyl chloride composition using blocked isocyanate and polyol and/or polyamine components that react upon heating to form a polyurethane or polyurea polymer network in-situ within the gelling polyvinyl chloride composition. The isocyanate component is said to contain isocyanate groups that must be blocked to enable the composition to be produced as a single component final product at a first location and then transported to a second location for actual article-forming use many days later without fear of premature gelation/network formation. The addition of the polyurethane or polyurea network is said to increase the resistance of the polyvinyl chloride to heat and solvents and reduce the occurrence of plasticizer migration therein.

Similarly, U.S. Pat. No. 7,157,527 describes preparation of interpenetrating polymer networks using blocked polyurethane/polyurea prepolymers. The polymer networks formed are based on a polyurethane or polyurea prepolymer in combination with a polymeric component including an acrylate resin or epoxy resin. The networks so formed are said to be useful as layers in golf balls.

U.S. Pat. No. 7,138,466 describes a polyurethane hot-melt adhesive composition. The adhesive composition is prepared using a moisture curable reactive hot-melt process. The compositions therein are said to have improved green strength and be useful for bonding a number of articles.

U.S. Pat. No. 4,292,827 describes a method for making decorative emblems, plaques, or panels comprising flow coating a clear, fluent plastic material (i.e., stated to be preferably a fluent polyurethane) onto the surface of a decorated substrate. Flow coating is accomplished with a multiple orifice nozzle(s) that is passed over the surface of the decorative substrate at a steady speed to give a uniform coating thickness of 0.020 inch to 0.030 inch. The flow-coated plastic is then cured and the coated, decorative substrate is stamped to form slightly convex emblems, plaques, or panels. Similarly, U.S. Pat. No. 4,332,074 describes formation of an integral bezel around the periphery of such a decorative surface.

While polyurethane-based chemistry is used to form a number of useful polymer films and articles, the use of such chemistry has not been successfully expanded to enable efficient formation of films. Thus, alternative methods for formation of polymer films, particularly polyurethane-based films, are desired. It would also be advantageous to provide polymerizable compositions that are polymerizable to films using improved methods, including continuous methods. Further, there is a recognized need to improve not only processing efficiency, but also optical properties of polymer films so formed.

BRIEF SUMMARY OF THE INVENTION

Advantageously, the present invention provides for formation of polymer films using improved methods. In preferred embodiments, methods of the invention comprise continuous methods.

Generally, a method for formation of a polymer film in-situ according to the invention comprises steps of: providing a polymerizable composition in one or multiple parts; prior to completion of polymerization of the polymerizable composition, forming a film therefrom; and initiating polymerization of the polymerizable composition using a radiation source to form the polymer film. In one embodiment, the polymerizable composition is essentially non-polymerized when forming a film therefrom. In exemplary embodiments, the polymerization of the polymerizable composition is initiated using a radiation source selected from ultraviolet radiation, thermal radiation, and electron beam radiation.

In a further embodiment, the polymerizable composition comprises at least one blocked component and the method further comprises the step of unblocking the blocked component subsequent to forming the film in order to facilitate bonding between the polymer film and an adjacent surface.

According to methods of the invention, polymer films are formed in-situ. In one embodiment, the polymerizable composition is positioned in a desired film shape on a supporting substrate. Further processing steps to shape the polymer into a film of desired dimensions are not required. After its formation, the polymer film is capable of being physically separated from the supporting substrate on which the polymer film is formed.

In one exemplary embodiment, the polymerizable composition has a dynamic viscosity of less than about 5 kiloPascal-seconds (500,000 centiPoise) during formation of a film therefrom. The polymerizable composition has a dynamic viscosity of less than about 4 Pascal-seconds (4,000 centiPoise) during formation of a film therefrom in another exemplary embodiment. According to another aspect of the invention, the polymerizable composition has a dynamic viscosity of more than about 2 Pascal-seconds (2,000 centiPoise) during formation of a film therefrom.

According to a preferred aspect of methods of the invention, the polymerizable composition is essentially free of solvents. As such, it is preferred that the polymer film is essentially free of unreacted solvent.

A variety of polymer films can be formed according to methods of the invention. In an exemplary embodiment, the polymer film is a performance film, such as a polymer film having an outdoor durability of at least about two years.

In a preferred embodiment, methods of the invention were found to be particularly beneficial for formation of polyurethane-based films. Polyurethane-based films according to the invention can be advantageously used in, for example, optical applications. According to one embodiment, the polymer film formed is essentially free of visual imperfections having a size of about 10 microns or greater. According to another embodiment, the polymer film formed is essentially free of visual imperfections having a size of about 5 microns or greater. According to yet further embodiments, the polymer film formed is essentially free of visual imperfections having a size of about 1 micron or greater.

Any suitable processing equipment can be used in methods of the invention. According to one embodiment, a polymer film is formed using coating equipment comprising a precision-ground surface contacting the polymerizing composition. According to yet another embodiment, a polymer film is formed using coating equipment comprising a low surface energy composition contacting the polymerizing composition.

DETAILED DESCRIPTION OF THE INVENTION

A method for formation of a polymer film in-situ according to the invention comprises steps of: providing a polymerizable composition in one or multiple parts; prior to completion of polymerization of the polymerizable composition, forming a film therefrom; and initiating polymerization of the polymerizable composition using a radiation source to form the polymer film.

"Polymer films" of the invention are relatively thin, continuous, single layers of polymeric material. In exemplary embodiments, polymer films are able to be physically separated from the supporting substrate on which they are formed so that they can be used as a stand-alone layer or as one of multiple layers in another application. Recognize, however, that polymer films may be formed contiguously with or subsequently laminated to other polymer films or layers (e.g., adhesive layers or release liners) according to further embodiments of methods of the invention.

Methods of the invention are useful for forming a wide variety of polymer films based on a variety of chemistries. Application of these methods finds particular use in formation of polymer films having, for example, improved performance and/or optical properties. In addition, preferred embodiments of the invention include methods of preparation of such polymer films without use of solvents (i.e., using 100% solids chemistry). As compared to many conventional technologies, preferred methods of the invention and polymer films prepared therefrom are environmentally friendly, cost-effective, plasticizer-free (e.g., phthalate plasticizer-free), and/or halogen-free (e.g., as compared to polyvinyl chloride). In exemplary embodiments, process efficiencies imparted by methods of the present invention facilitate a reduction in polymer processing cost, enabling production of polymer films that are not only a superior, but also a cost-effective, replacement for polyvinyl chloride films.

According to one aspect of the invention, polymer films prepared according to methods of the invention have advantageous performance properties. Performance properties obtainable in exemplary polymer films prepared according to methods of the invention include, for example, a gloss value of about 14 to about 20 when measured using a 60-degree gloss meter according to test methods known to those of ordinary skill in the art (e.g., ASTM D2457-03, ASTM D523, variations thereof, and similar methods).

Yet other performance properties obtainable in polymer films prepared according to methods of the invention include, for example, a defects gray scale value of at least 4 (i.e., indicating no defects or only slight, but unremarkable, defects) after heat aging for 168 hours at 80° C. when measured according to test methods known to those of ordinary skill in the art (e.g., ASTM D2616-96, variations thereof, and similar methods).

Still other performance properties obtainable in polymer films prepared according to methods of the invention include, for example, a defects gray scale value of at least 4 (i.e., indicating no defects or only slight, but unremarkable, defects) after ten cycles of exposure to leaded or unleaded gasoline for 10 seconds followed by 20 seconds of non-exposure when measured according to test methods known to those of ordinary skill in the art (e.g., ASTM D2616-96, variations thereof, and similar methods).

In one embodiment, polymer films prepared according to methods of the invention meet one or more of the performance requirements for one or more of the film types set forth in GM Engineering Standard GM6074M ("Decorative Exterior Decals") published by General Motors Corporation and incorporated herein by reference in its entirety, when applied to a surface as specified therein. Such polymer films are understood to be "performance films," as the phrase is used herein. Preferably, such performance films meet a majority of the performance requirements for one or more of the film types set forth in GM Engineering Standard GM6074M ("Decorative Exterior Decals"). Most preferably, such polymer films meet essentially all of the performance requirements for one or more of the film types set forth in GM Engineering Standard GM6074M ("Decorative Exterior Decals").

Performance films according to the invention are capable of exhibiting superior outdoor durability. Exemplary performance films of the invention exhibit an outdoor durability of about two years or more, preferably about five years or more, and more preferably about ten years or more. A performance film is understood to be durable if it exhibits a defects gray scale value of at least 4 (i.e., indicating no defects or only slight, but unremarkable, defects) after repeated exposure to an outdoor environment. Outdoor durability can be measured in a simulated environment according to methods known to those of ordinary skill in the art. For example, the following test methods can be used: SAEJ2020 (QUV-B for 1,000 hours using 313 nanometer UV lamps), SAEJ1960 (Xenon for 2,000 hours), Simulated Florida PV 3930 (Xenon for 1,600 hours), and Simulated Arizona PV 3929 (Xenon for 1,500 hours). A performance film is also understood to be durable in the presence of water and humidity if it exhibits a defects gray scale value of at least 4 (i.e., indicating no defects or only slight, but unremarkable, defects) after being immersed in 40° C. water for 168 hours when measured according to test methods known to those of ordinary skill in the art (e.g., ASTM D2616-96, variations thereof, and similar methods). Certain conventional polymer films, such as calendared polyvinyl chloride, are known to exhibit outdoor durability of about two years; however, further performance films are preparable according to the novel methods of the invention.

According to another aspect of the invention, polymer films prepared according to methods of the invention are capable of having improved optical properties as compared to films of the same chemistry prepared using other methods. Optical properties of a polymer film can be evaluated using methods and equipment known to those of ordinary skill in the art. For example, cross-polarized light can be used to optically evaluate polymer films as described by Earl T. Hackett, Jr. in "Film Inspection Using Cross-Polarized Light—The Old Method Can Give New Life to Film Inspection Procedures," *Pharmaceutical & Medical Packaging News*, July 2004. Polymer films can also be optically evaluated using methodology and equipment incorporated in ISRA VISION SYSTEMS, such as the SMASH Advanced Surface Inspection System (available from ISRA Surface Vision, Inc. of Norcross, Ga.).

According to an exemplary embodiment, polymer films of the invention are essentially free of visual imperfections having a size of about 10 microns or greater. According to a further exemplary embodiment, polymer films of the invention are essentially free of visual imperfections having a size of about 5 microns or greater. According to yet another exemplary embodiment, polymer films of the invention are essentially free of visual imperfections having a size of about 1 micron or greater. Such polymer films are obtainable using the methods and components described herein.

According to one aspect of the invention, a polymer film is formed from a polymerizable composition of the invention. While polymer films of the invention can be any suitable and desired thickness, polymer films of the invention preferably having a thickness of less than about 0.24 inch (6 mm) and more preferably less than about 0.039 inch (1 mm). It is to be understood, however, that thicker and thinner polymer films can also be formed according to the invention. For example, polymer films as thin as 0.010 inch (0.25 mm), 0.0010 inch (0.025 mm), and even 0.0001 inch (0.0025 mm), can be formed in exemplary embodiments. In any event, it is preferred that the polymer film has a sufficient thickness to maintain its integrity as a continuous polymer layer.

According to improved methods of the invention, polymer films are formed in-situ. In many embodiments, further processing steps to shape the polymer into a film of desired dimensions are not required. It is to be understood that, as used herein, when a polymerizable composition of the invention is polymerized into a desired polymer film "in-situ," polymerization of the polymer comprising the film can begin just before, while, or shortly after the polymerizable composition is being positioned into the desired film format and polymerization is essentially completed during such positioning or shortly thereafter.

Polymerizable Compositions

By use of the term "polymerizable," it is to be understood that such a composition contains components that will polymerize upon initiation using a radiation source. In one embodiment, the polymerizable composition is essentially non-polymerized when forming a film therefrom. In exemplary embodiments, the polymerization of the polymerizable composition is initiated using a radiation source selected from ultraviolet radiation, thermal radiation, and electron beam radiation.

The polymerizable composition may exist in one or multiple parts, depending on the nature of the components therein. It is also to be understood that each part of the polymerizable composition may itself comprise more than one premixed components.

"Polymerizable compositions" of the invention include at least two different components (e.g., monomers, which can be mono-, di-, tri-functional, etc.), wherein the two components are mutually reactive with each other via chemically different reactive moieties to form a polymeric backbone. The two components may react to form the polymeric backbone in linear, branched, and/or networked polymers. In preferred embodiments, polymerizable compositions are polymerizable using free radical growth or similar polymerization methods capable of being initiated using a radiation source. For example, poly(meth)acrylates, polyurethanes, polyureas, and polyvinyls are capable of being formed according to the invention using such polymerization methods.

In an exemplary embodiment, each of the at least two different components forming the polymerizable composition has an average molecular weight that is less than about 1% of the weight average molecular weight of the fully polymerized composition. In another exemplary embodiment, each of the at least two different components forming the polymerizable composition has an average molecular weight that is less than about 10% of the weight average molecular weight of the fully polymerized composition. In yet another exemplary embodiment, each of the at least two different components forming the polymerizable composition has an average molecular weight that is less than about 50% of the weight average molecular weight of the fully polymerized composition.

The maximum viscosity capable of facilitating positioning of the composition onto the underlying substrate can vary and depends on many factors, such as e.g., methodology, chemistry of the composition, processing temperature, and desired properties (e.g., thickness) of the resulting polymer film. In one exemplary embodiment, the polymerizable composition has a dynamic viscosity, measured using a Brookfield Viscometer as known to those of ordinary skill in the art, of less than about 5 kiloPascal-seconds (500,000 centiPoise) during formation of a film therefrom. In another exemplary embodiment, it is preferred that the polymerizable composition has a dynamic viscosity of less than about 6-Pascal seconds (6,000 centiPoise), and more preferably less than about 4 Pascal-seconds (4,000 centiPoise), during its positioning into the desired film format. The polymerizing composition is positionable at such a viscosity without requiring that it be heated to significantly elevated temperatures.

Maintaining sufficient flowability, as evidenced by a workable viscosity, is counter-balanced by the need to maintain a minimum viscosity such that the polymerizable or polymerizing composition is flowable onto a substrate in a controlled manner. If flow is uncontrollable, the polymerizable composition is often not capable of efficiently forming a polymer film without undesirably running off the substrate onto which it is coated. Thus, it is preferred that the polymerizable composition has a dynamic viscosity, measured using a Brookfield Viscometer as known to those of ordinary skill in the art, of more than about 1.5 Pascal-seconds (1,500 centiPoise), and more preferably more than about 2 Pascal-seconds (2,000 centiPoise), during its positioning into the desired film format. In an exemplary embodiment, the polymerizable composition has a dynamic viscosity of about 1.5 Pascal-seconds (1,500 centiPoise) to about 6 Pascal-seconds (6,000 centiPoise) during formation of a film therefrom.

Understand that a polymerizable composition may be partially polymerized or essentially non-polymerized. In order to maximize processing efficiency processing, however, it is preferred that polymerizable compositions are essentially non-polymerized prior to initiating polymerization thereof using a radiation source according to methods of the invention. Thus, the use of specialized and costly components and/or additional processing steps and associated equipment is eliminated according to such preferred aspects of methods of the invention.

Exemplary polymer films prepared according to methods of the invention are polyurethane-based. For simplicity, the term "polyurethane" as used herein includes polymers containing urethane (also known as carbamate) linkages, urea linkages, or combinations thereof (i.e., in the case of poly (urethane-urea)s). Thus, polyurethane-based compositions contain at least urethane linkages, urea linkages, or combinations thereof. Furthermore, polyurethane-based polymers are based on polymers where the polymeric backbone has at least 80% urethane and/or urea repeat linkages formed during the polymerization process.

Polyurethane-based performance films prepared according to methods of the invention have many uses. For example, they can replace polyvinyl chloride used in many applications, such replacement being at a significantly lower cost than when polyurethane-based films prepared according to conventional methods are used. In addition, polyurethane-based films prepared according to the invention can replace the use of, for example, polyester films on hurricane glass due to the desirable optical properties of polyurethane-based films prepared according to exemplary methods of the invention. Polyurethane-based films prepared according to methods of the invention can also be economically used as optically clear paint protection film according to exemplary embodiments.

Polymer films comprising polyurethane-based polymers are prepared according to methods of the invention by reacting components, which include at least one isocyanate-reactive (e.g., hydroxy-functional, such as polyol) component and at least one isocyanate-functional (e.g., polyisocyanate) component. For example, components of exemplary polymerizable compositions and which are useful in the formation of polyurethane-based polymer films according to methods of the invention are described in PCT Patent Application No. PCT/US09/58500, incorporated herein by reference in its entirety.

Further polyurethane-based polymer films include those based on urethane acrylate components described in U.S. Patent Publication No. 2009/0297724, which is incorporated herein by reference in its entirety. Advantageously, as compared to the methods described in U.S. Patent Publication No. 2009/0297724, the polymer components described therein are polymerized in-situ after a polymerizable composition comprising the same is formed into a film according to improved methods of the present invention.

In order to defer reaction of the resulting polymer film with an adjacent surface according to certain embodiments of the invention, the isocyanate-reactive component, isocyanate-functional component, catalyst, and/or chain extender can be blocked in further embodiments of the invention. For example, the polymerizable composition may contain isocyanate-reactive components, isocyanate-functional components, catalyst, and/or chain extenders having functional groups that remain blocked (i.e., non-reactive) until a time subsequent to formation of the polymer film and at which time enhanced bonding between the polymer film and an adjacent surface may be desired (e.g., as in an epoxy/urethane lamination). While the discussion of blocked components herein is predominantly with respect to the exemplary embodiment comprising formation of a polyurethane-based film, it is to be understood that similar use of blocked components can be incorporated into methods of forming polymer films comprising other chemistries.

Any suitable additives can be present in polymerizable compositions of the invention. In some embodiments, polymer films are formed according to methods of the invention without inclusion of any additives. If present, however, additives are selected as known to those skilled in the art based on the intended application and radiation source used to initiate polymerization. Exemplary additives include those described in PCT Patent Application No. PCT/US09/58500 and U.S. Patent Publication No. 2009/0297724. For example, when the radiation source comprises ultraviolet radiation, the polymerizable composition generally comprises at least one photoinitiator. The polymerizable composition can also comprise stabilizers, such as hindered amine light stabilizers and/or ultraviolet light absorbers of the benzotriazole or benzotriazine families, including derivatives thereof. Further, polymerizable compositions of the invention can comprise one or more organic-inorganic hybrid materials synthesized through a sol gel process.

Preferably, in order to further maximize processing efficiency and facilitate obtainment of polymer films having improved properties, polymerizable compositions of the invention are essentially free of solvents (e.g., organic solvents and water) that must be removed after formation of the polymer film or that can cause undesired reaction by-products. For example, significant water content in the isocyanate-reactive component can react with the isocyanate-functional component, which undesirably creates carbon dioxide gas and urea that can become entrapped in the polymer film and contribute to visual imperfections therein. While certain components of the polymerizable compositions may function in a manner similar to traditional solvents, such components can be integrated into the resulting polymer film without detrimentally impacting desired properties thereof (e.g., optical qualities) according to preferred embodiments of methods of the invention.

Conventionally, solvents are used to reduce viscosity of a composition such that a composition is coatable during formation of a film therefrom, after which time additional steps are necessary to remove the solvent from the composition or polymer film formed. Thus, such conventional solvents do not become integrated into the resulting polymer film and are generally not preferred for use according to the present invention. According to methods of the present invention, if individual components are prepared or supplied in conventional solvent, it is preferred to remove essentially all of the solvent prior to polymerization of the compositions of which they are a part. Any suitable method as known to those of ordinary skill in the art can be used to remove solvent from a component. In an exemplary embodiment, such components are vacuum-dried according to methods known to those of ordinary skill in the art to remove undesired solvent.

Recognizing the beneficial properties of solvents, however, in an exemplary embodiment the polymerizable compositions include components that function as a traditional solvent in that they help impart desired coatability of the composition, but yet they react with and become incorporated into the polymer films formed according to methods of the invention. For example, acrylic-capped urethanes can be included in polymerizable compositions of the invention for this purpose.

Polymerization Methods

As noted above, initiation of polymerization according to in-situ methods of the invention begins just prior to when, while, or shortly after the polymerizable composition is positioned into the desired film format. Formation of a film begins prior to completion of polymerization of the polymerizable composition, preferably prior to initiation of polymerization of the polymerization composition. As used herein, "completion of polymerization" of the polymerizable composition such that polymerization of a film is "essentially completed" is understood to refer to a degree of polymerization at which a film's structure is sufficiently stable to allow for additional processing or storage thereof. Thereafter, the polymerizing composition is fully polymerized to form the polymer film. As used herein, the polymerizing composition is understood to be "fully polymerized" to a polymer film when its degree of polymerization renders the polymer film suitable for its intended use. Polymerization is essentially completed during or shortly after film formation. That is, once polymerization is initiated, polymerization preferably occurs quickly to maximize efficiency in methods of forming polymer films according to the invention.

Any suitable method can be used to position the polymerizable composition into a film format. In an exemplary embodiment, conventional coating equipment is used to draw the composition into a film. Such coating equipment includes that equipment understood by those of ordinary skill in the art to be associated with, for example, spraying, curtain coating, roll coating, brush coating, slot die coating, or mandrel coating. Polymerizable composition can be provided to such coating equipment using any suitable metering equipment. In order to further minimize the possibility that processing equipment will become clogged or the film formed therefrom may contain visual imperfections, conventional coating equipment can optionally be modified to facilitate unobstructed movement of the composition therethrough. Exemplary modification methods include precision grinding of surfaces contacting the polymerizing composition or coating of the same with a low surface energy composition (e.g., such as those low surface energy compositions used in release liners).

Initiation of polymerization of the polymerizable composition is accomplished using any suitable radiation source. Exemplary radiation sources include ultraviolet radiation, thermal radiation, and electron beam radiation. Those of ordinary skill in the art will understand how to utilize such radiation sources to polymerize compositions of the invention. For example, the polymerizable composition can be exposed to an ultraviolet light source having a wavelength of about 180 nm to about 450 nm. The amount of time that the polymerizable composition is exposed to such a radiation source depends on, for example, thickness of the film formed therefrom. Ideal exposure time depends on, for example, line speed, length of the radiation source along the line, intensity of the radiation source (e.g., about 100 Watts/inch to about 600 Watts/inch), and temperature of the polymerizable composition.

Polymer films may be formed contiguously with or subsequently laminated to other polymer films or layers (e.g., adhesive layers or release liners) according to further embodiments of methods of the invention. In order to support the composition in the desired film format, an underlying substrate (e.g., a web in continuous methods of the invention) is utilized in preferred embodiments of the invention. Any suitable substrate can be used as known to those of ordinary skill in the art of polymerization. For example, non-woven or woven fibrous substrates, which may or may not be removed before use of the polymer film in its intended application, as well as polymer-based substrates to which the polymer film bonds and substrates comprising low surface energy materials, which may or may not be removed before use of the polymer film in its intended application (e.g., as a tape), are exemplary substrates.

In general, methods for in-situ polymerization of polymerizable compositions according to methods of the invention can be performed in not only batch processes, but also continuous processes. For example, web-based processing equipment can be adapted for use in exemplary continuous processing methods of the invention. Polymer films can be efficiently prepared on a release-coated web, laminated with a release liner, for example, and continuously rolled onto themselves according to continuous methods of the invention. According to another embodiment of a continuous method of the invention, polymer films are prepared on a double-sided release liner and continuously rolled onto themselves without need for lamination of a top release liner on the polymer film before rolling. Due to their improved processing efficiency, continuous processes are preferred for formation of polymer films according to the invention. The risk of continuous processing equipment becoming clogged or of the film so formed containing undesirable visual imperfections therein is reduced as compared to when batch processes are used.

Methods of the invention can include additional processing steps associated with traditional curing of polymer films formed therefrom. Advantageously, however, any curing needed or desired is generally minimal as compared to that associated with conventional methods.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language. Further, as used throughout, ranges may be used as shorthand for describing each and every value that is within the range. Any value within the range can be selected as the terminus of the range. Similarly, any discrete value within the range can be selected as the minimum or maximum value recited in describing and claiming features of the invention.

In addition, as discussed herein it is again noted that the polymerizable composition described herein may comprise all components in one or multiple parts. Further, while reference is made herein to preparation of the various intermediate components (e.g., prepolymers), recognize that some such intermediate components may be commercially available and, as such, can be used according to the invention as an alternative to otherwise preparing the same. Other variations are recognizable to those of ordinary skill in the art. Note also that molecular weights given herein are number average molecular weights unless specified otherwise.

The invention claimed is:

1. A method for formation of a polyurethane-based polymer film in-situ, the method comprising steps of:
   providing a polymerizable composition in one or multiple parts, wherein the polymerizable composition is essentially non-polymerized and comprises at least an isocyanate-functional component and an isocyanate-reactive component that are mutually reactive with each other via chemically different reactive moieties to form a polyurethane-based polymeric backbone where at least 80% urethane and/or urea repeat linkages in the polyurethane-based polymeric backbone are subsequently formed after polymerization of the polymerizable composition is initiated;
   positioning the polymerizable composition into a desired film format,
   initiating polymerization of the polymerizable composition using a radiation source just before, while, or shortly after the polymerizable composition is being positioned into the desired film format to form the polyurethane-based polymer film; and
   essentially completing polymerization during such positioning or shortly thereafter,
   wherein the polyurethane-based polymer film is formed prior to completion of polymerization of the polymerizable composition,
   wherein the polyurethane-based polymer film is based on polymers having a polymeric backbone where at least 80% urethane and/or urea repeat linkages are formed during polymerization of the polymerizable composition to form the polyurethane-based polymer film, and
   wherein the polymer film can be physically separated from a supporting substrate on which the polymer film is formed.

2. The method of claim 1, wherein the radiation source comprises ultraviolet radiation.

3. The method of claim 1, wherein the radiation source comprises thermal radiation.

4. The method of claim 1, wherein the radiation source comprises electron beam radiation.

5. The method of claim 1, wherein the polymerizable composition has a dynamic viscosity of less than about 4 Pascal-seconds (4,000 centiPoise) during formation of a polymer film therefrom.

6. The method of claim 1, wherein the polymerizable composition has a dynamic viscosity of more than about 2 Pascal-seconds (2,000 centiPoise) during formation of a polymer film therefrom.

7. The method of claim 1, wherein the polymer film has an outdoor durability of at least about two years.

8. The method of claim 1, wherein the polymer film is essentially free of visual imperfections having a size of about 10 microns or greater.

9. The method of claim 1, wherein the polymer film is essentially free of visual imperfections having a size of about 5 microns or greater.

10. The method of claim 1, wherein the polymer film is essentially free of visual imperfections having a size of about 1 micron or greater.

11. The method of claim 1, wherein the polymer film comprises an aliphatic urethane acrylate.

12. The method of claim 1, wherein the polymer film is essentially free of unreacted solvent.

13. The method of claim 1, wherein the polymerizable composition is essentially free of solvents.

14. The method of claim 1, wherein the polymer film is formed using coating equipment comprising a precision-ground surface contacting the polymerizable composition.

15. The method of claim 1, wherein the polymer film is formed using coating equipment comprising a low surface energy composition contacting the polymerizable composition.

16. The method of claim 1, wherein the polymer film is formed on a polymer-based substrate to which the polymer film bonds.

17. A continuous process comprising the method of claim 1.

18. The method of claim 1, wherein the polymerizable composition has a dynamic viscosity of less than about 6 Pascal-seconds (6,000 centiPoise) during formation of a polymer film therefrom.

19. The method of claim 1, wherein the polymer film is a continuous, single layer of material.

20. The method of claim 1, wherein polymerization begins just before the polymerizable composition is being positioned into a desired film format.

21. The method of claim 1, wherein polymerization begins while the polymerizable composition is being positioned into a desired film format.

22. The method of claim 1, wherein the polymerizable composition comprises multiple parts.

23. The method of claim 1, wherein the polymer film is formed on a web.

24. The method of claim 1, wherein the polymer film is formed on a supporting substrate and further comprising the step of physically separating the polymer film from the supporting substrate on which the polymer film is formed.

25. The method of claim 2, wherein the ultraviolet radiation source has an intensity of 100 Watts/inch to 600 Watts/inch.

26. The method of claim 2, wherein the ultraviolet radiation has a wavelength of about 180 nm to about 450 nm.

27. The method of claim 1, wherein the polymer film has a defects gray scale value of at least 4 after ten cycles of exposure to leaded or unleaded gasoline for 10 seconds followed by 20 seconds of non-exposure.

28. The method of claim 1, wherein the polymer film has a defects gray scale value of at least 4 after heat aging for 168 hours at 80° C.

29. The method of claim 1, wherein the polymer film has a gloss value of about 14 to about 20 when measured using a 60-degree gloss meter.

30. The method of claim 1, wherein the polymer film has a defects gray scale value of at least 4 after being immersed in 40° C. water for 168 hours.

* * * * *